Oct. 13, 1959  C. VAN DER LELY ET AL  2,908,130
SIDE DELIVERY RAKING WHEEL
Original Filed Nov. 9, 1953  3 Sheets-Sheet 2
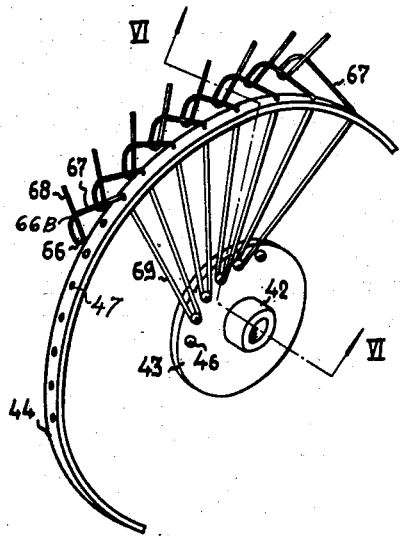
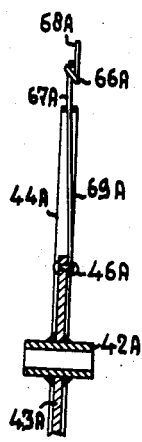
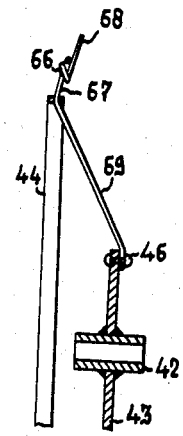

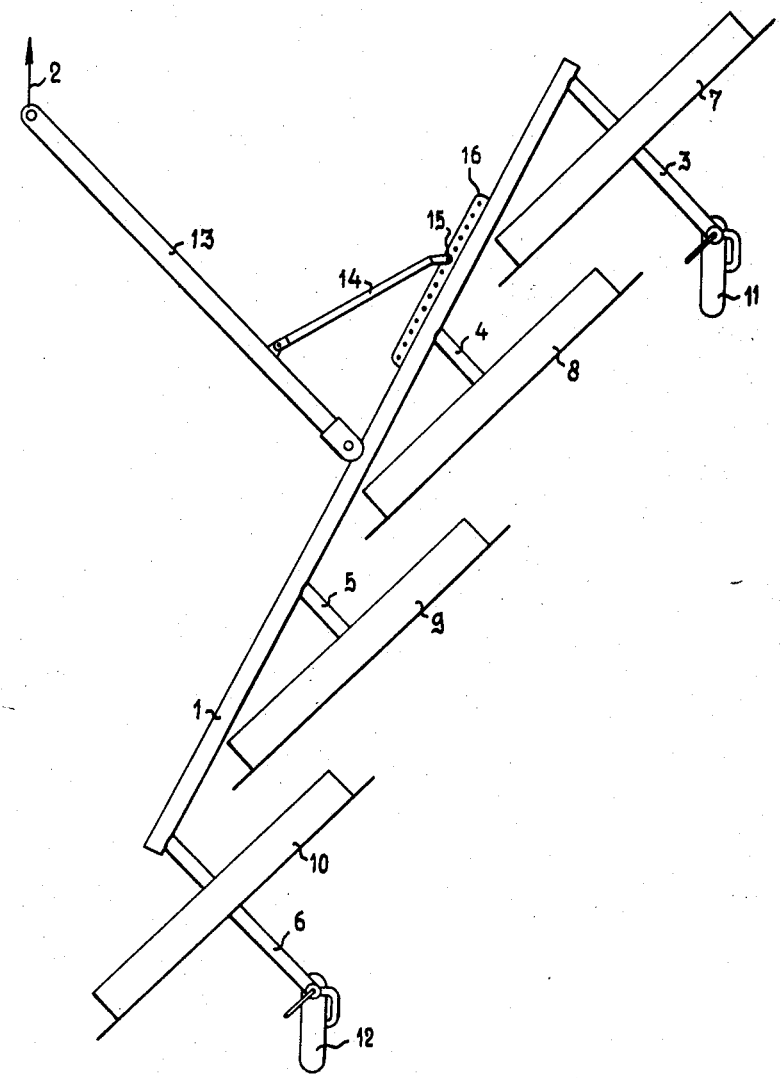

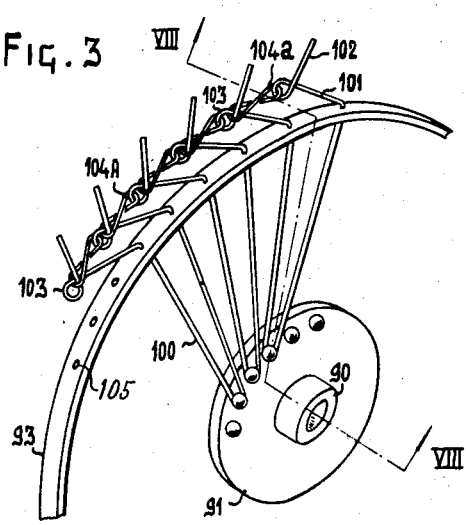
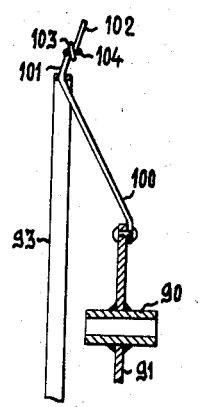
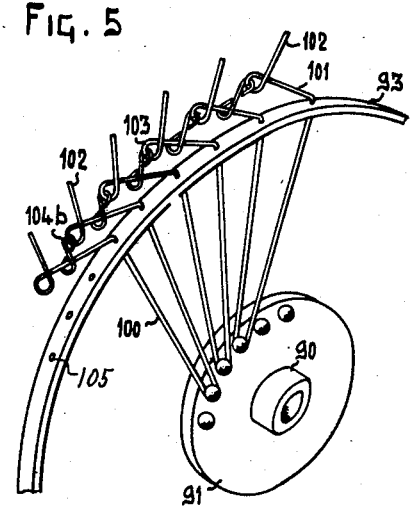
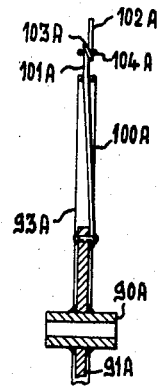

United States Patent Office 2,908,130
Patented Oct. 13, 1959

2,908,130

SIDE DELIVERY RAKING WHEEL

Cornelis van der Lely and Ary van der Lely, Maasland, Netherlands, assignors, by mesne assignments, to C. van der Lely Canada Ltd., Ottawa, Ontario, Canada, a corporation of Canada Original application November 9, 1953, Serial No. 390,981, now Patent No. 2,860,478, dated November 18, 1958. Divided and this application October 13, 1958, Serial No. 766,742

27 Claims. (Cl. 56—377)

This invention relates to raking members, and more particularly to raking members for use in raking devices having a mobile frame and a substantially horizontal axle upon which one or more raking members are mounted at an angle to the direction of movement of the frame. The raking members in such devices are rotated by their contact with the ground and rakable substance during movement of the mobile frame. The periphery of each raking member has teeth for moving rakable substance over the ground, such teeth being mounted to permit their deflection when the teeth are under a load.

In existing raking devices of this kind, means are provided which permit variation of the elevation of the axle carrying the raking member in its relation to the frame. For example, the axle may be formed by the crankpin of a crank rotatably mounted on the frame. The use of such an arrangement in a device having a plurality of raking members arranged in a row will permit the raking members to adjust themselves individually with respect to elevation, so that a row of raking members is adaptable to substantial unevenness in the terrain. Existing devices depend upon deflection of the circumferential teeth of the raking members for their adaptation to small irregularities or unevenness in the terrain. However, when the teeth of existing raking members undergo even a relatively small deflection, their ability to displace the substance lying on the ground in the desired direction is diminished or lost as the deflected teeth, being less vertical in their position, tend to drag over the rakable substance.

Accordingly, an object of this invention is to provide raking members or raking wheels particularly adapted for use on a raking device as described and having teeth capable of a high degree of deflection without losing or diminishing their ability to carry along the rakable substance.

In accordance with the invention, the above objective is realized by providing means which retain the teeth of the raking member in favorable positions to perform their raking function, whether the teeth are in a normal condition, or in a substantially deflected condition.

The foregoing characteristic in raking wheels embodying this invention results in the following advantages:

(a) The raking wheels provide a more efficient raking operation resulting in a smaller loss of the rakable substance or material since less material will remain on the ground following passage of the raking device;

(b) Very uneven terrain may be worked effectively;

(c) The raking device requires a smaller number of raking members or wheels for the same width than normally necessary in conventional raking members and as a result is less expensive; and (d) The axles of the raking members may be rigidly secured to the frame of the raking device since the adaptation of the raking members to the contours of the ground can be effected solely by deflection of the teeth, rather than by bodily displacement of the raking members as heretofore.

Still further objects, features, advantages and details of the present invention will appear in the following description which is to be read in connection with the accompanying drawings in which various embodiments of the invention have been illustrated by way of example.

This is a division of our application filed November 9, 1953, Serial No. 390,981, now Patent 2,860,478.

Figure 1 is a top plan view of a raking device of the kind on which raking members embodying the present invention are to be used;

Figure 2 is a fragmentary perspective view of a raking member constructed in accordance with this invention;

Figure 3 is a front elevational view of a raking member constructed in accordance with another embodiment of this invention;

Figure 4 is an enlarged detail view of a linking member employed in the embodiment of Figure 3; and Figure 5 is a view similar to Figure 3, but showing a modification in the linkage arrangement;

Figure 6 is a view of the raking member shown in Figure 2, shown through section lines VI—VI in Figure 2;

Figure 7 is a sectional view similar to Figure 6, but illustrating a modification of the raking member shown in Figure 2;

Figure 8 is a section view of the raking member shown in Figure 3 and the modification of Figure 5 through section line VIII—VIII in Figures 3 and 4.

Figure 9 is a sectional view similar to Figure 8, but illustrating a modification of the raking member shown in Figure 3 and also a further modification of raking member in Figure 5.

Referring to the drawings in detail and initially to Figure 1, a side delivery rake of the kind on which raking members constructed in accordance with the present invention are to be employed, there is shown a frame formed by an elongated beam 1 extending obliquely with respect to the normal direction of movement of the device, as indicated by the arrow 2. Four parallel axles 3, 4, 5 and 6 are rigidly secured to the beam 1 and extend substantially horizontally therefrom. The axles 3, 4, 5 and 6 carry rotatable raking members 7, 8, 9 and 10, respectively. The end axles 3 and 6 carry running wheels 11 and 12 which support the frame and maintain the latter at a predetermined elevation above the ground. The wheels 11 and 12 are preferably self-adjusting or swivel wheels which may, if desired, be locked in any position.

An adjustable draw arm 13 is hingedly connected to the beam 1 permitting an arc of movement relative to the latter in a substantially horizontal plane. The arm 13 may be locked in any desired angular position relative to the beam 1 by means of a rod 14 which, at one of its ends, is hingedly connected to the arm 13 and has an aperture 15 at its free end. The rod 14 may be arranged with its aperture 15 above any of the corresponding apertures provided in member 16 secured to the beam 1. Thus the rod 14 may be secured in a position by means of a pin or bolt extending through the aperture of the rod 14 and the aligned aperture of member 16.

In the embodiment shown in Figure 2, the raking member is provided with a hub 42 carrying a circular disc 43. The rim 44 is provided with a plurality of apertures and is concentric with the hub 42 and the circular disc 43. A plurality of bolts 46 are arranged around the periphery of the disc 43. Raking tooth 68, a hook means or link for engaging the adjacent wire comprising loop connection 66, a supporting member 67 and a torsion means 69 are formed from a single piece of resilient steel wire of, for example, 0.4 cm. diameter. The torsion means 69 for two adjacent teeth are integral with each other and are joined together at a bent part secured under the head of bolt 46. The torsion means 69 extend through the apertures 47 in the rim 44, each of the apertures 47 functioning as a bearing for one torsion means 69. Beyond the rim 44, each steel wire is bent substantially at right angles to hold the rim 44 against radial movement relative to the axis of hub 42, while permitting the rim 44 to respond to heavy loads by deflecting elastically out of its normally radially extending plane. The portions of the steel wires which are bent at right angles outside of the rim 44 form supporting members 67 for the raking teeth 68. Each integral structure includes a raking tooth 68, and supporting member 67 and a torsion means 69 which, together, are somewhat Z-shaped. In this embodiment, the steel wire has loop connection 66 at the junction of the raking tooth 68 and the supporting member 67. By this means, the penetration of rakable substance from the teeth into the space between related supporting members is avoided. Each loop connection 66 consists of a loop formed in the steel wire extending from the related supporting member 67 in the direction opposed to the tooth 68. Each loop 66, the ends of which may be intertwined or otherwise secured together at 66B, if desired, embraces and thereby links the supporting member 67 of the adjacent tooth.

In the claims, the rim 44 and the parts within the rim 44 including the hub 42, disc 43, bolts 46, and torsion means 69, comprise a central portion of the raking member as represented in Figures 2, 6 and 7. Further, for the purpose of the claims, it is to be noted that the torsion means 69, the supporting member 67 together with loop 66 and a tooth 68 comprise a first portion, a second portion, and a third raking portion, respectively, of a resilient rod.

According to the embodiment of the invention shown in Figure 3, the rim 93 is connected to the disc 91 upon hub 90 by steel wires 100 in the same manner as heretofore described for the embodiment shown in Figure 2. The wires 100 extend through apertures 105 in the related rim 93 and, at the outside of the rim, are bent so as to form supporting members 101 for raking teeth 102 at the outer ends of the steel wires. Each wire is formed with a loop 103 between the raking tooth 102 and the related supporting member 101.

In order to limit the distance or spacing between the successive teeth, links 104 (Figure 4) are employed. Said links 104 are bent from a piece of steel wire in the shape of a Figure 8. In Figure 3, the links, indicated at 104a, engage the successive loops 103. In the embodiment of Figure 5, which is exactly like that of Figure 3 except that the links, indicated at 104b, engage a loop 103 at one side and a supporting member 101 of the adjacent raking tooth at the other side. In both cases, the links serve to establish the greatest distance that may occur between adjacent raking teeth.

In the claims, the rim 93 and parts within the rim 93 including the hub 90, disc 91 and wires 100 comprise a central portion of the raking member as represented in Figures 3, 5, 8 and 9. Further, for the purpose of clarifying the claims, it is to be noted that the wires 100, the supporting members 101 and the raking teeth 102 comprise first portions, second portions, and third raking portions, respectively, of resilient rods.

It is considered preferable in this invention that the disc and rim member of each embodiment lie in different planes, as shown in Figures 6 and 8. Thus it will be noted from Figure 6 that the raking member is disposed laterally with the hub 42 being forward of the rim 44 with both spaced in distinct but parallel planes. The same is true for the hub 90 and the rim 93 in Figure 8.

In the embodiment of Figures 7 and 9, the various parts are identified by the same reference numerals employed in connection with the corresponding parts in Figures 6 and 8 respectively, but with the capital letter A appended thereto. Thus, in Figure 7, the raking members are all disposed in substantially one radial plane, i.e. the torsion means 69A, the rim 44A, the supporting members 67A, the loops 66A, and the raking teeth 68A are all disposed in one radial plane passing through the disc 43A of the raking member. In like manner, the raking members of Figure 9 are in substantially one plane, i.e. the torsion means 100A, the rim 93A, the supporting member 102, the link 104A and the raking teeth 102A are all disposed in one radial plane passing through the disc 91A.

The raking members illustrated in the drawings present supporting members for the raking teeth which are directed forward in the direction of rotation. However, it is also possible to have these supporting members directed backwards.

It will be understood that the supporting members need not be rectilinear. A curved form may be advantageous in certain cases. Numerous other variations in the described construction are possible.

The above description and drawings disclose several embodiments of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

We claim:

1. A raking member comprising a wheel having a central portion, a pair of adjacent resilient supporting members operatively associated with said central portion and extending outwardly and at an angle therefrom, a connecting link extending from solely one of said supporting members to the other of said supporting members, said connecting link linking said supporting members, and raking teeth each extending from the terminal portion of said supporting members and outwardly with respect thereto.

2. A raking member according to claim 1 wherein said connecting link consists of hook means extending from the terminal portion of one of said supporting members and embracing the other supporting member.

3. A raking member according to claim 1 wherein said connecting link consists of a loop extending from the terminal portion of one of said supporting members and embracing the other supporting member.

4. A raking member according to claim 1 wherein said connecting link consists of an 8-shaped link.

5. A raking member comprising a hub rotatable about an axis, a rim member having radial openings therethrough, said rim member being spaced from said hub and substantially concentric therewith, resilient rods attached to said hub and each having a first portion extending through said openings in said rim member, said resilient rods each having a second portion on the outside of said rim member extending at an angle to said first portion, said resilient rods each having a third raking portion extending outwardly from said second portion, and connecting links, each of said connecting links solely linking together the second portion of one of said resilient rods with the second portion of the adjacent rod.

6. A raking member according to claim 5 wherein said second portions of said resilient rods extend from said openings in said rim members in a direction substantially tangential to said rim member.

7. A raking member according to claim 5 wherein there is between said second portion and said third portion of said resilient rods an angle of between 90° and 180°.

8. A raking member comprising a hub rotatable about an axis, a rim member, resilient rods attached to said hub, each of said resilient rods having a first portion extending to said rim member and a second portion on the outside of said rim member extending substantially normally to said first portion, connecting links, each of said connecting links providing a link between the second portion of one of said resilient rods and the second portion of the adjacent rod, said resilient rods each having a third raking portion extending outwardly from said second portion, said first and second portions forming torsion means for said third raking portion.

9. A raking member comprising a hub rotatable about an axis, a rim member having radial openings therethrough, said rim member being spaced from said hub and substantially concentric therewith, a disc extending outwardly from said hub and rigidly connected thereto, said disc being within and substantially concentric with said rim member, said disc having at substantially its periphery a plurality of bolts, at least one resilient rod attached to each of said bolts, each of said rods having a first portion extending through said openings in said rim member, said resilient rods each having a second portion at the outside of said rim member extending substantially normally to said first portion, the terminal portion of said second portion having formed therein a loop which extends substantially toward said rim member and embraces said second portion of the adjacent rod, and said resilient rods each having a third raking portion extending from said second portion in a direction substantially opposite to the before-mentioned loop formed in the terminal portion of said second portion.

10. A raking member according to claim 9 wherein each of said bolts has two resilient rods attached thereto.

11. A raking member according to claim 10 wherein two said resilient rods are joined in the vicinity of said bolt.

12. A raking member comprising a hub rotatable about an axis, a rim member having a radial opening therethrough, said rim member being spaced from said hub and substantially concentric therewith, a disc extending outwardly from said hub and rigidly connected thereto, said disc being within and substantially concentric with said rim member, said disc having at substantially its periphery a plurality of bolts, at least one resilient rod attached to each of said bolts, each of said rods having a first portion extending through said opening in said rim member, said resilient rods each having a second portion on the outside of said rim member extending substantially normally to said first portion, the terminal portion of said second portion having formed therein a loop, connecting links extending through each of the aforementioned loops in each of said second portions and being operatively associated with a portion of an adjacent one of said rods, said resilient rods each having a third raking portion extending outwardly from said second portion.

13. A raking member according to claim 12 wherein said connecting links are figure eight shaped.

14. A raking member according to claim 12 wherein the operative association of each of said connecting links with an adjacent rod of said resilient rods consists of each said connecting link extending through the loop formed at the terminal portion of said second portions of the aforementioned adjacent rods of said resilient rods.

15. A raking member according to claim 12 wherein the operative association of each of said connecting links with an adjacent rod of said resilient rods consists of a said connecting link extending around the said second portions of the aforementioned adjacent rods of said resilient rods between the aforementioned loop formed therein and said rim member.

16. A raking member according to claim 12 wherein each of said bolts has two resilient rods attached thereto.

17. A raking member according to claim 12 wherein two said resilient rods are joined in the vicinity of said bolt.

18. A raking member comprising a wheel having a central portion, a resilient supporting member operatively associated with said central portion, a raking tooth extending from the terminal portion of said supporting member, a second supporting member extending from said central portion, said second supporting member having formed therein a loop which embraces the first supporting member.

19. A raking member according to claim 18, wherein each supporting member has a loop and a raking tooth extending from its terminal portion.

20. A raking member comprising a wheel having a central portion, resilient supporting members operatively associated with said central portion, raking teeth extending from the terminal portions of said supporting members, said supporting members having portions defining hook means for hooking said supporting members one into the other.

21. A raking member comprising a wheel having a central portion, supporting members operatively associated with said central portion, raking teeth extending from the terminal portions of said supporting members and a series of individual connecting members extending between the terminal portions of the supporting members.

22. A raking member according to claim 21, wherein each supporting member has a separate connecting member, connecting said supporting member with an adjacent supporting member.

23. A raking member according to claim 18 wherein said supporting members are substantially in a plane perpendicular to the axis of rotation of the raking member.

24. A raking member according to claim 18 wherein said raking member is substantially uniplanar.

25. A raking member according to claim 18, having a frame, running wheels connected to said frame, and a plurality of further similar raking members, said raking member being mounted with said further raking members in overlapping echelon and arranged obliquely with respect to the normal direction of movement of said raking device.

26. A raking member according to claim 18 having a third supporting member adjacent said first mentioned supporting member, said first mentioned and third supporting members each comprising portions of the same resilient wire.

27. A raking member according to claim 18 having a further supporting member adjacent said second supporting member, said second and further supporting members each comprising portions of the same resilient wire.

References Cited in the file of this patent

UNITED STATES PATENTS

| 2,851,846 | Van der Lely | Sept. 16, 1958 |
| 2,860,478 | Van der Lely | Nov. 18, 1958 |

FOREIGN PATENTS

| 480,889 | Italy | May 13, 1953 |

OTHER REFERENCES

Information Circular #4, North Carolina State College, May 1951, page 2. (Copy in Div. 5.)